US006959636B2

(12) United States Patent
Graziano

(10) Patent No.: US 6,959,636 B2
(45) Date of Patent: Nov. 1, 2005

(54) PRODUCE SLICER

(75) Inventor: Joseph M. Graziano, Tualatin, OR (US)

(73) Assignee: Prime Slice, LLC, Tualatin, OR (US)

(*) Notice: Subject to any disclaimer, the term of this patent is extended or adjusted under 35 U.S.C. 154(b) by 91 days.

(21) Appl. No.: 10/406,909

(22) Filed: Apr. 2, 2003

(65) Prior Publication Data

US 2004/0194597 A1 Oct. 7, 2004

(51) Int. Cl.[7] .............................. A23L 1/00; B26D 1/03

(52) U.S. Cl. .......................... 83/857; 83/402; 83/404.3; 83/932; 83/444; 83/858; 83/425.3; 99/537; 99/543

(58) Field of Search ................................ 83/402, 425.2, 83/425.3, 431, 425.1, 932, 856–858, 437.2; 99/537–538, 516, 591; 426/481, 518

(56) References Cited

U.S. PATENT DOCUMENTS

| | | | | | |
|---|---|---|---|---|---|
| 2,487,431 | A | | 11/1949 | Floyd | |
| 3,109,468 | A | * | 11/1963 | Lamb et al. | 99/589 |
| 3,116,772 | A | | 1/1964 | Lamb et al. | |
| 3,942,399 | A | | 3/1976 | Giangiulio | |
| 3,949,637 | A | | 4/1976 | Funke, nee Honsel | |
| 4,059,037 | A | * | 11/1977 | Gerson et al. | 83/407 |
| 4,137,807 | A | | 2/1979 | Schaumberg | |
| 4,244,252 | A | | 1/1981 | Pellaton | |
| 4,310,971 | A | | 1/1982 | Rowell | |
| 4,567,801 | A | | 2/1986 | Jones | |
| 4,569,280 | A | | 2/1986 | D'Ambro et al. | |
| D287,452 | S | | 12/1986 | Stern | |
| 4,766,793 | A | * | 8/1988 | Fischer et al. | 83/698.11 |
| 5,009,141 | A | * | 4/1991 | Julian et al. | 83/857 |
| 5,063,674 | A | | 11/1991 | Rowell | |
| 5,095,794 | A | * | 3/1992 | Mendenhall | 83/858 |
| 5,125,308 | A | * | 6/1992 | Mendenhall | 83/857 |
| 5,255,583 | A | * | 10/1993 | Andrews | 83/39 |
| 5,375,512 | A | | 12/1994 | Ertmer | |
| 5,655,428 | A | * | 8/1997 | Cockburn et al. | 83/857 |
| 5,979,281 | A | | 11/1999 | Caesar | |
| 6,045,071 | A | | 4/2000 | Emsens | |
| 6,116,130 | A | | 9/2000 | Cogan | |
| 6,413,566 | B2 | | 7/2002 | Caridis et al. | |
| 6,418,823 | B1 | | 7/2002 | Taitler | |
| 6,725,765 | B1 | * | 4/2004 | Mendenhall | 99/537 |
| 2004/0040427 | A1 | * | 3/2004 | Mendenhall | 83/98 |

FOREIGN PATENT DOCUMENTS

| | | | |
|---|---|---|---|
| DE | 37 07 827 | A1 | 3/1988 |
| DE | 200 14 747 | U1 | 12/2000 |
| EP | 0 873 828 | A2 | 10/1998 |
| EP | 0 873 828 | A3 | 10/1999 |
| WO | WO 02/068159 | A1 | 9/2002 |

* cited by examiner

*Primary Examiner*—Boyer D. Ashley
(74) *Attorney, Agent, or Firm*—Christensen O'Connor Johnson Kindness PLLC

(57) ABSTRACT

A produce slicer 10 for slicing produce is disclosed. The produce slicer includes a frame (12) defining a cavity (16) having a central axis (22). A plurality of radial cutting blades (20) are disposed in the cavity, wherein each of the radial cutting blades are substantially contained by an imaginary plane, wherein the imaginary planes of the radial cutting blades extend radially outward from the central axis toward the frame. The produce slicer (10) further includes a plurality of ancillary cutting blades (24) extending inward from the frame (12) and into the cavity (16). Each ancillary cutting blade intersects at least one of the radial cutting blades at a location between the frame and the central axis. The ancillary cutting blades may include a first series (50) of blades located substantially perpendicularly to a second series (52) of blades. The radial cutting blades may intersect the ancillary cutting blades at an oblique angle.

25 Claims, 8 Drawing Sheets

PRODUCE SLICER

FIELD OF THE INVENTION

The present invention relates generally to produce slicers, and more particularly, to produce slicers having both radial and ancillary cutting blades.

BACKGROUND OF THE INVENTION

Produce slicers are commonly used in today's food supply and preparation service industries. In previously developed produce slicers, the article of produce, such as an onion, is pressed through a set of radially oriented blades, thereby slicing the onion into wedges, typically into six sixty degree wedges. After the onion is sliced into wedges, the onion is further processed by a series of rotary blades which further randomly slice the onion wedges into smaller pieces.

Although previously developed produce slicers have been found effective, they are not without their problems. First, the slicing process takes two steps; first a wedging operation, and second, a rotary slicing operation. This two step process is time consuming and expensive. Additionally, since the rotary blades randomly cut the article of produce, the resulting cuttings are random in shape and size. This is often disadvantageous since most consumers prefer cuttings of uniform shape and size. Further, inasmuch as the rotary blades randomly cut the article of produce, the cuts may not be selectively oriented. For some articles of produce, this may not be of concern, however for others, for example onions, this may be unsatisfactory. More specifically, onions comprise a plurality of spherically shaped layers, each layer having an inner and outer protective skin protecting the flesh of the onion disposed between the inner and outer protective skins. When randomly cutting an onion, the protective skins of each layer are disturbed, thus exposing the flesh of the onion to air. The exposure to air oxidizes and decomposes the flesh at an accelerated rate, thus decreasing the shelf life of the onion by leading to the premature spoiling of the onion cuttings.

Further still, the random nature of the cutting of the rotary blades often results in a significant portion of the produce cuttings having pointed or sharp ends. The pointed/sharp ends have very little mass, and therefore, when cooked, heat more rapidly than the main body of the cutting. The rapid heating of the pointed/sharp ends often causes the ends to burn, resulting in a damaged and unanesthetically pleasing cooked product.

Also, the random cutting of the article of produce results in a high quantity of fines and slabs, a fine being too small for use and a slab having a length to width ratio that does not meet specifications (typically a wide, short cutting).

Thus, there exists a need for a produce slicer that may fully slice an article of produce in fewer steps, with less cell disruption, with a reduced amount of sharp and/or pointed ends, with increased uniformity of size and shape of cuttings, with a reduced amount of fines and/or slabs, that is inexpensive to manufacture, reliable, and meets the performance expectations of the end user.

SUMMARY OF THE INVENTION

In accordance with one embodiment of the present invention, a produce slicer for slicing produce is provided. The produce slicer includes a frame defining a cavity having a central axis. A plurality of radial cutting blades are disposed in the cavity, wherein each of the radial cutting blades are substantially contained by an imaginary plane, wherein the imaginary planes of the radial cutting blades extend radially outward from the central axis toward the frame. A plurality of ancillary cutting blades are disposed in the cavity, each ancillary cutting blade intersecting at least one of the radial cutting blades at a location between the frame and the central axis.

In accordance with another embodiment of the present invention, a produce slicer for slicing produce is provided. The produce slicer includes a frame disposed about a cavity having a central axis. A first series of cutting blades are disposed in the cavity, each of the first series of cutting blades contained by an imaginary plane, the imaginary planes of the first series of cutting blades oriented substantially parallel to one another. A second series of cutting blades are disposed in the cavity, each of the second series of cutting blades contained by an imaginary plane, the imaginary planes of the second series of cutting blades oriented substantially parallel to one another. A third series of cutting blades are disposed in the cavity, each of the third series of cutting blades contained by an imaginary plane, the imaginary planes of the third series of cutting blades extending radially outward from the central axis and located at oblique angles relative to the imaginary planes of the first and second series.

In accordance with still another embodiment of the present invention, a produce slicer for slicing produce comprising a frame defining a cavity having a central axis is provided. The produce slicer includes a plurality of radial cutting blades disposed in the cavity, each radial cutting blade oriented parallel with an imaginary line, each imaginary line extending radially outward from the central axis towards the frame, wherein each of the radial cutting blades have a cutting surface, the cutting surface inclined relative to the central axis. A plurality of ancillary cutting blades are disposed in the cavity, the ancillary cutting blades extending inward from the frame and intersecting at least one of the radial cutting blades between the frame and the central axis, wherein each of the ancillary cutting blades have a cutting surface, the cutting surface inclined relative to the central axis. The cutting surfaces of the radial and ancillary cutting blades form a concave cutting array.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
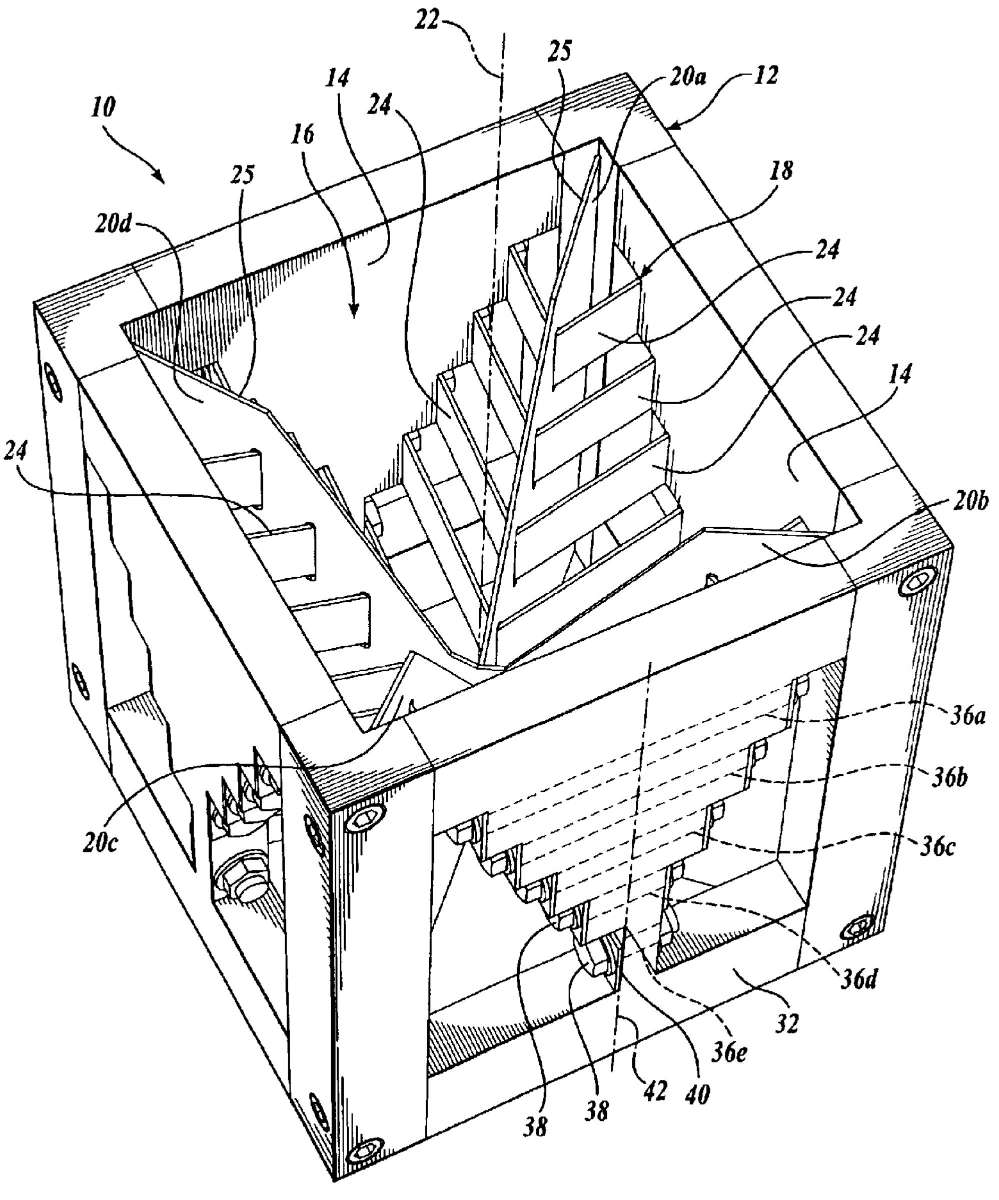
FIG. 1 is an isometric view of a produce slicer formed in accordance with one embodiment of the present invention.

FIGS. 1–8 illustrate one embodiment of a produce slicer 10 formed in accordance with the present invention. Referring to FIG. 1, an isometric view of the produce slicer is depicted. Generally described, the produce slicer 10 includes a frame 12 having four walls 14 oriented orthogonal to one another, thereby defining a box shaped cavity 16 therein. The top and bottom of the frame 12 are open. A plurality of cutting blades are disposed within the cavity 16. The cutting blades within the cavity 16 present a concave cutting array 18 to an article of produce pressed through the cavity 16 from above. The concave cutting array 18 is formed from four radial cutting blades 20*a*, 20*b*, 20*c*, and 20*d*, each of which extends radially inward from one of the corners of the frame 12 to a central axis 22 of the cavity 16. A cutting surface 25 of each of the radial cutting blades 20 is arcuate or inclined in shape, such that the height of each of the radial cutting blades 20 decreases from a maximum height near the walls 14 of the frame 12 to a minimum height at the central axis 22 of the produce slicer 10. The arcuate or inclined shape of the radial cutting blades 20 helps form the concave shape of the cutting array 18.

An array of ancillary cutting blades 24 extend inward from each wall 14 at a selected spacing interval from each other, such as a ½ inch. The ancillary cutting blades 24 extend inward from their respective wall 14 of the frame 12 until intersecting one of the four radial cutting blades 20*a*, 20*b*, 20*c* or 20*d*. The ancillary cutting blades 24 do not all extend inward from the walls 14 at the same height. More specifically, the height at which each of the ancillary cutting blades 24 extend inward from the walls 14, i.e. the height at which each of the ancillary cutting blades 24 is attached to one of the walls 14, is staggered, such that the ancillary cutting blades 24 near the corners of the frame 12 extend inward from the frame 12 at a maximum height, while the ancillary cutting blades 24 nearest the center of the wall extend inward at a minimum height. This helps to form the concave shape of the cutting array 18 presented to the article of produce to be cut. Further, the ancillary cutting blades 24 are slightly inclined such that the portions of the ancillary cutting blades 24 coupled to the walls 14 are at a higher elevation than the portions of the ancillary cutting blades 24 intersecting one of the radial cutting blades 20.

In operation, an article of produce, such as a fruit or vegetable or other agricultural product, some suitable examples being an onion that has been topped and tailed, a green pepper, apple, pair, orange, carrot, celery, etc., is inserted into the cavity 16 and pushed against the concave cutting array 18. The article of produce may be pushed through with a plunger (not shown), the plunger having a head having a plurality of grooves, each groove aligned to accept one of the cutting blades of the cutting array. Alternately, a non-grooved plunger may be used, wherein the plunger pushes a first article of produce partially through the cutting array and is then retracted while a second article of produce is placed on the cutting array. The plunger then acts upon the second article of produce to push the first article of produce further through the cutting array. Preferably, the longitudinal axis of the article of produce is aligned concentrically with the central axis 22 of the produce slicer 10.

The cutting blades 20 and 24 engage and cut the article of produce in a staggered relationship due to the concave shape of the cutting array 18. A large percentage of the resultant cuttings having limited cell disruption for increased shelf life. A large percentage of the cuttings include truncated, blunt ends, which are resistant to burning during cooking. Further, the produce slicer 10 results in very little waste, as the portion of the cuttings considered to be "fines" or "slabs" is significantly reduced relative to previously developed produce slicers. Further still, the produce slicer 10 results in cuttings which are substantially uniform in size and shape, which is especially true when an onion that has been topped and tailed has been pressed through the cutting array with the onion's longitudinal axis aligned with the longitudinal axis of the produce slicer 10.

The concave shape of the cutting array 18 aids in centering the article of produce in the cavity 16. Further, the concave shape of the cutting array 18 aids in maintaining the correct orientation of the article of produce and staggers the engagement of the cutting blades 20 and 24 upon the article of produce, thereby reducing the amount of cutting friction exerted upon the cutting array 18 by the article of produce at any one time as the article of produce is pushed through the cutting array 18.

Figure 2:
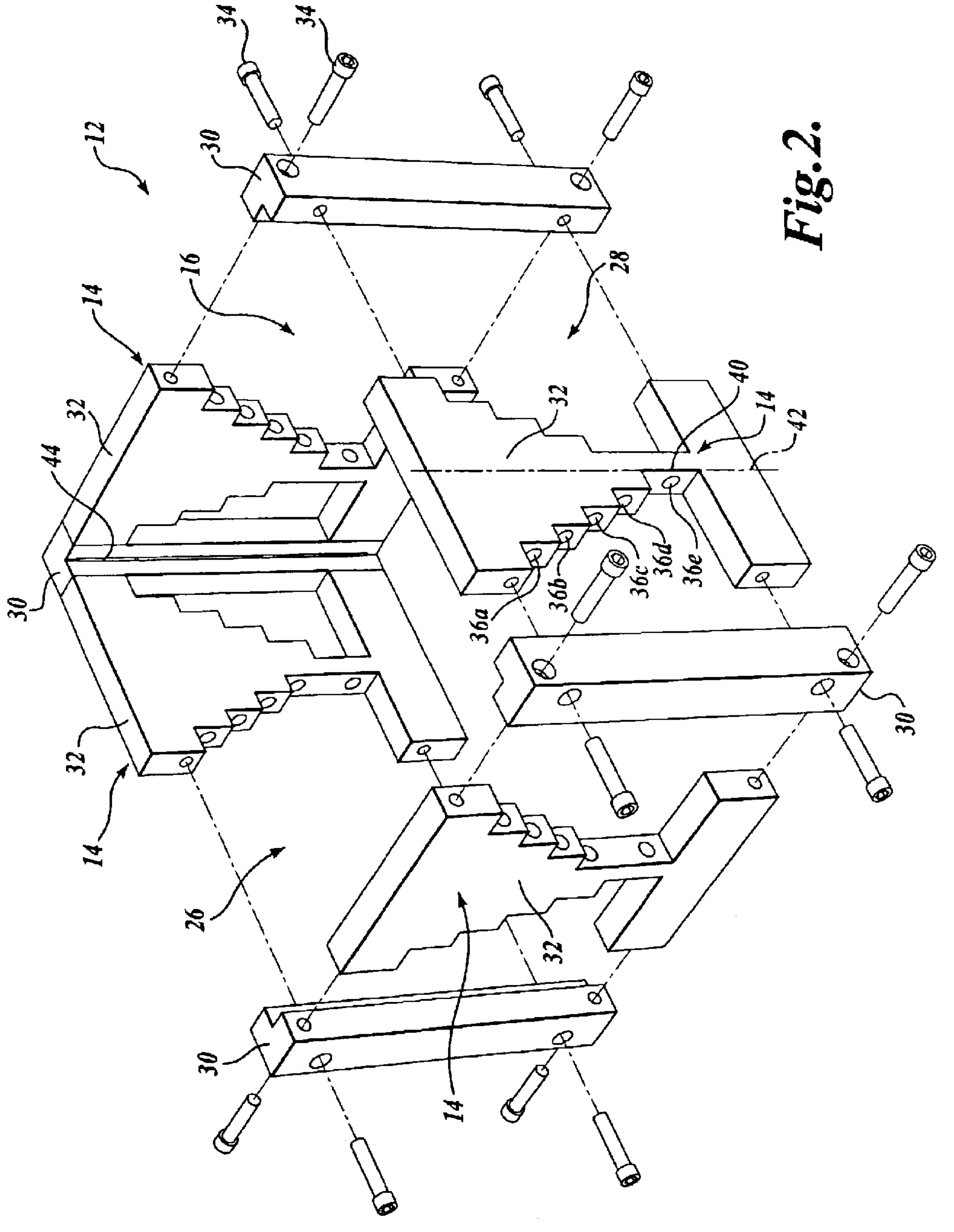
FIG. 2 is an exploded isometric view of a frame of the produce slicer depicted in FIG. 1.

In light of the above general description of the produce slicer 10, a more detailed description of the components forming the produce slicer 10 will now be provided. Referring to FIG. 2, the frame 12 is a box shaped structure having four planar walls 14 defining the inner cavity 16, the inner cavity having a first open end 26 and a second open end 28 located opposite the first open end 26. The four planar walls 14 of the illustrated embodiment are located perpendicular to one another and are preferably constructed from a rigid material, such as aluminum. Each wall 14 is formed by coupling two corner columns 30 to an attachment member 32. The corner columns 30 are coupled to the attachment members 32 by a plurality of well known fasteners 34. Each corner column 30 has a groove 44 (best seen in FIG. 7) oriented parallel with the central axis 22 (see FIG. 1). Each groove 44 is sized and shaped to receive a distal end 46 (see FIG. 3) of one of the radial blades, for securing the blade to the frame 12.

Referring to FIGS. 1 and 2, each attachment member 32 includes a plurality of bores 36*a*, 36*b*, 36*c*, 36*d*, and 36*e* extending horizontally through the attachment member. The bores 36 are sized to permit well known fasteners 38 to pass therethrough during securement of the ancillary cutting blades 24 to the attachment members 32. The bores 36 are each of a selective length, each bore 36 of a length less than the above adjacent bore. Each bottom most bore 36*e* has a first end 40 disposed on a centerline 42 of the attachment member 32. The bore 36*d* located immediately above the bottom most bore 36*e* has distal ends which terminate a ½ inch on either side of the centerline 42. The next upward adjacent bore 36*c* has distal ends which terminate 1 inch from the centerline 42. This pattern is repeated resulting in bore 36*b* having distal ends located 1.5 inches from the centerline 42 and bore 36*a* having distal ends located two inches from the centerline 42. Thus, the distal ends of the bores 36 stair step inward from the top to the bottom of the attachment members 32 orientating the ancillary cutting blades 24 at a specific spacing interval, which in the illustrated embodiment, is a ½ inch. Further, configuring the bores 36 as described results in the staggering of the height of the ancillary cutting blades 24. As mentioned above, the staggering of the height of the ancillary cutting blades 24 helps create the concave shape of the concave cutting array 18 as should be apparent to those skilled in the art.

As should also be apparent to those skilled in the art, although specific spacing intervals are described, other spacing intervals are suitable for use with the present invention, such as 1 inch, 5⁄16 of an inch, ¼ of an inch, 3⁄16 of an inch, etc. Further, although the spacing interval is preferably uniform, it should be apparent to the those skilled in that the spacing interval may vary. Further, although the frame 12 of the illustrated embodiment is depicted as a box shaped structure having four planar walls 14, it should be apparent to those skilled in the art that the frame may take many forms, such as circular, triangular, oval, etc. Further still, although the frame 12 of the illustrated embodiment is depicted as a box of a specific size, it should be apparent to those skilled in the art that the frame may vary in size as well as shape without departing from the spirit and scope of the present invention. Further yet, it should be apparent to those skilled in the art that although the frame 12 is shown as containing only a single cutting array 18, the frame 12 may alternately be formed to house a plurality of cutting arrays.

Figure 3:
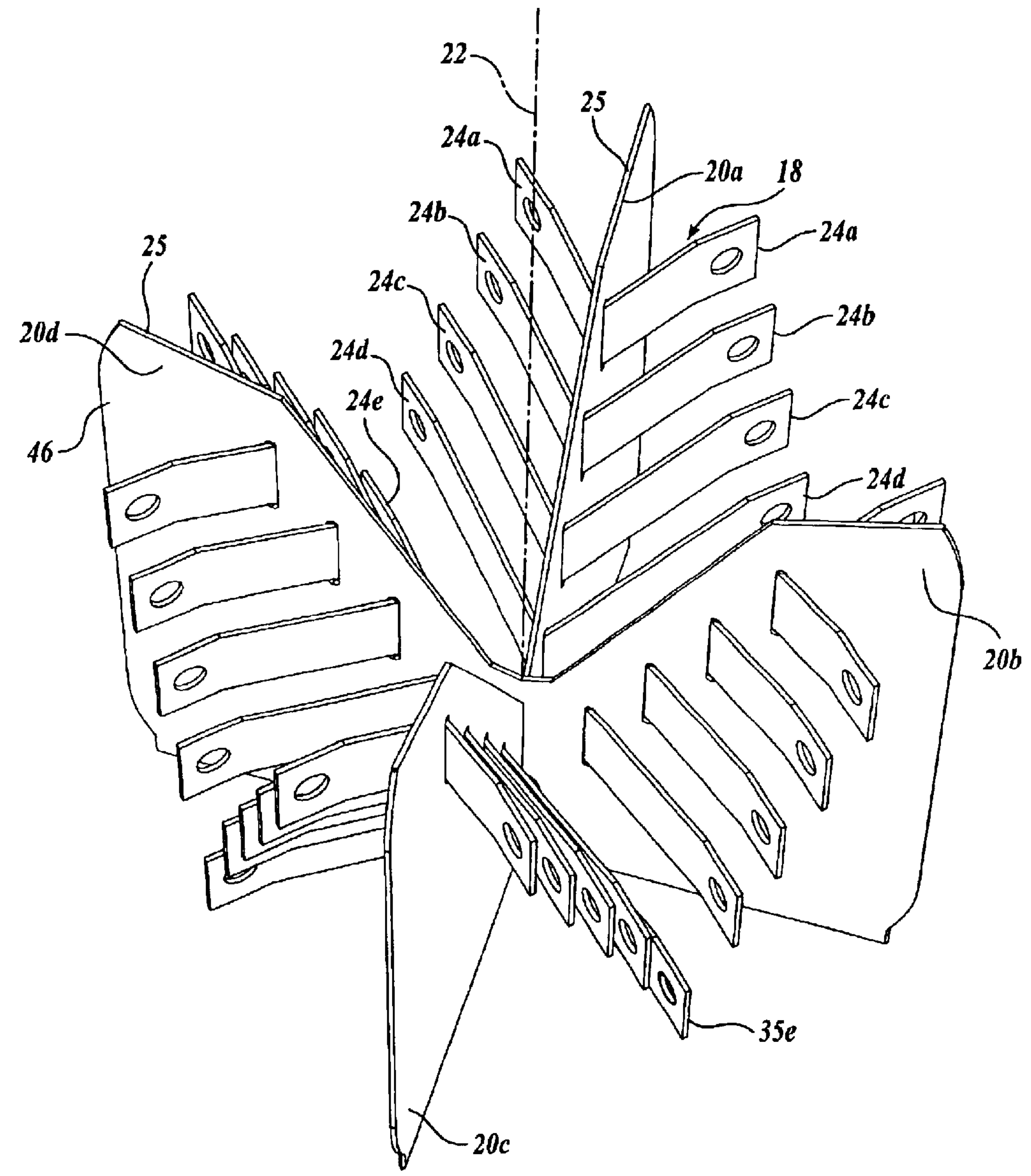
FIG. 3 is an isometric view of a cutting array of the produce slicer depicted in FIG. 1, the cutting array formed by a plurality of radial and ancillary cutting blades and wherein the frame has been removed for clarity.
Figure 4:
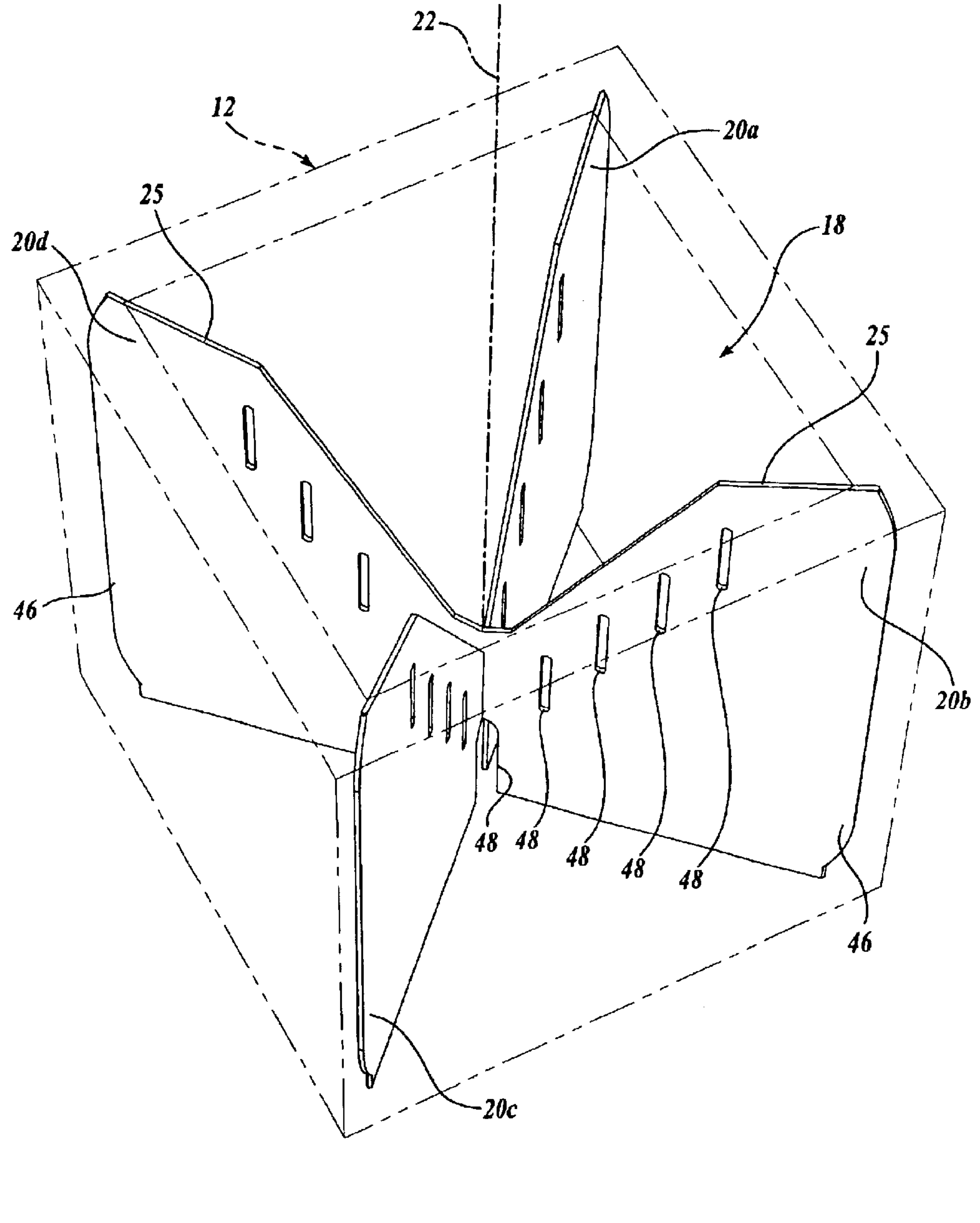
FIG. 4 is an isometric view of the radial cutting blades of the produce slicer depicted in FIG. 3, wherein the frame is shown in phantom.
Figure 5:
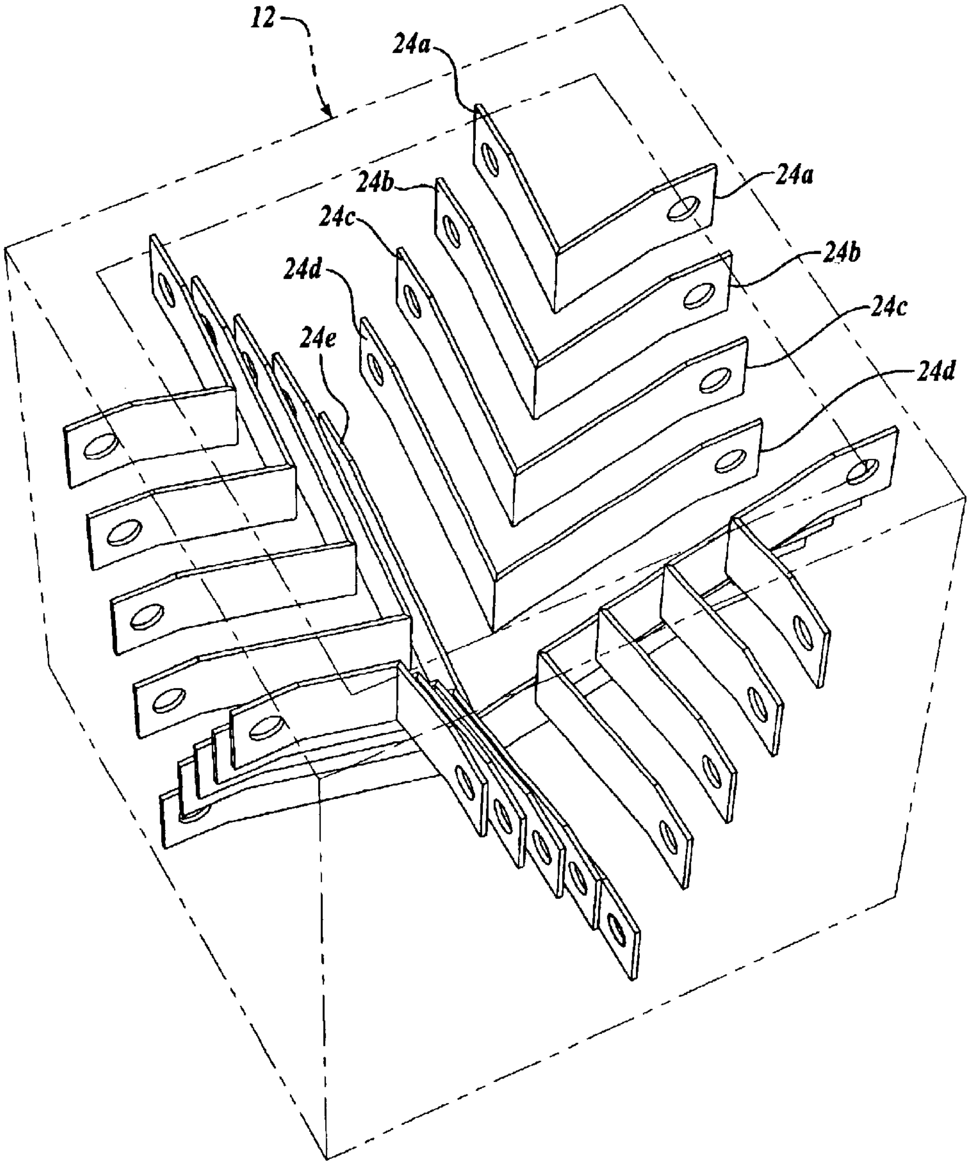
FIG. 5 is an isometric view of the ancillary cutting blades of the cutting array of the produce slicer depicted in FIG. 3, wherein the frame is shown in phantom.
Figure 6:
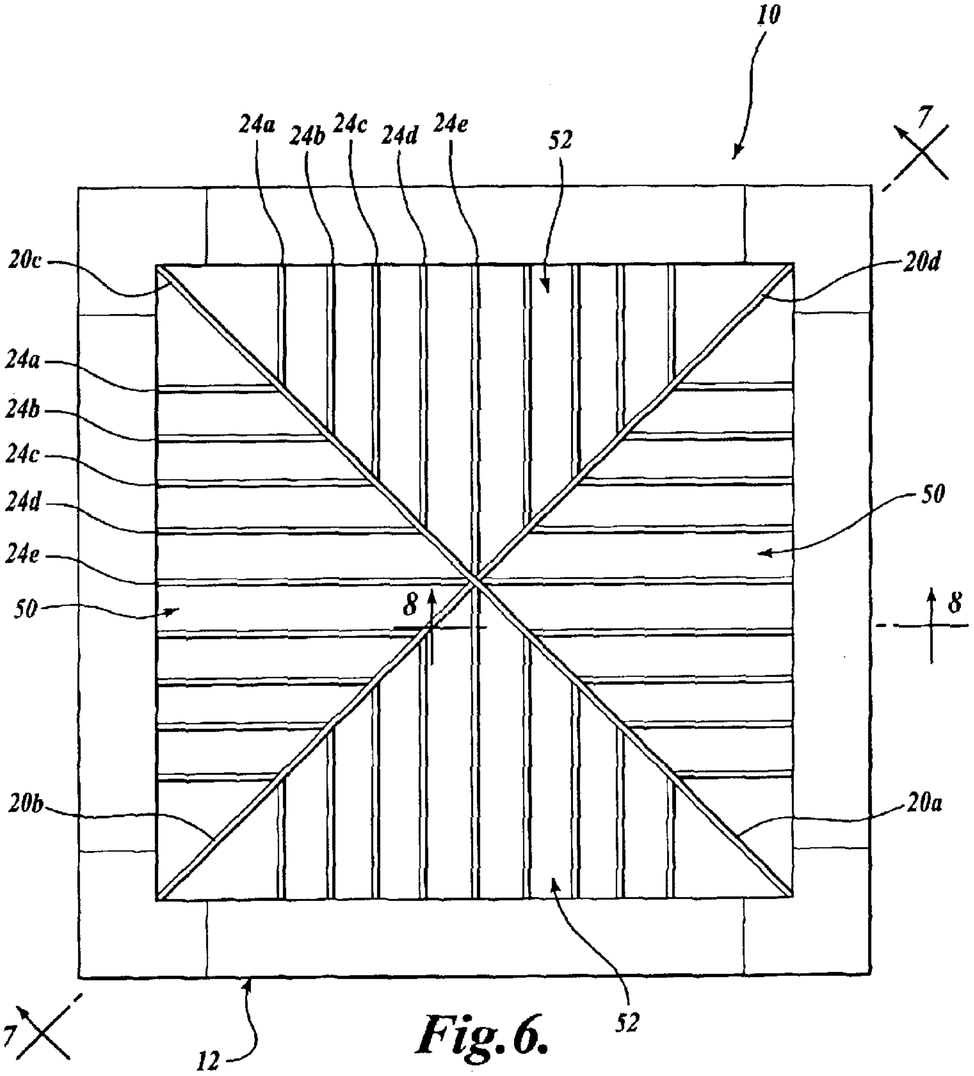
FIG. 6 is a top view of the produce slicer depicted in FIG. 1.
Figure 7:
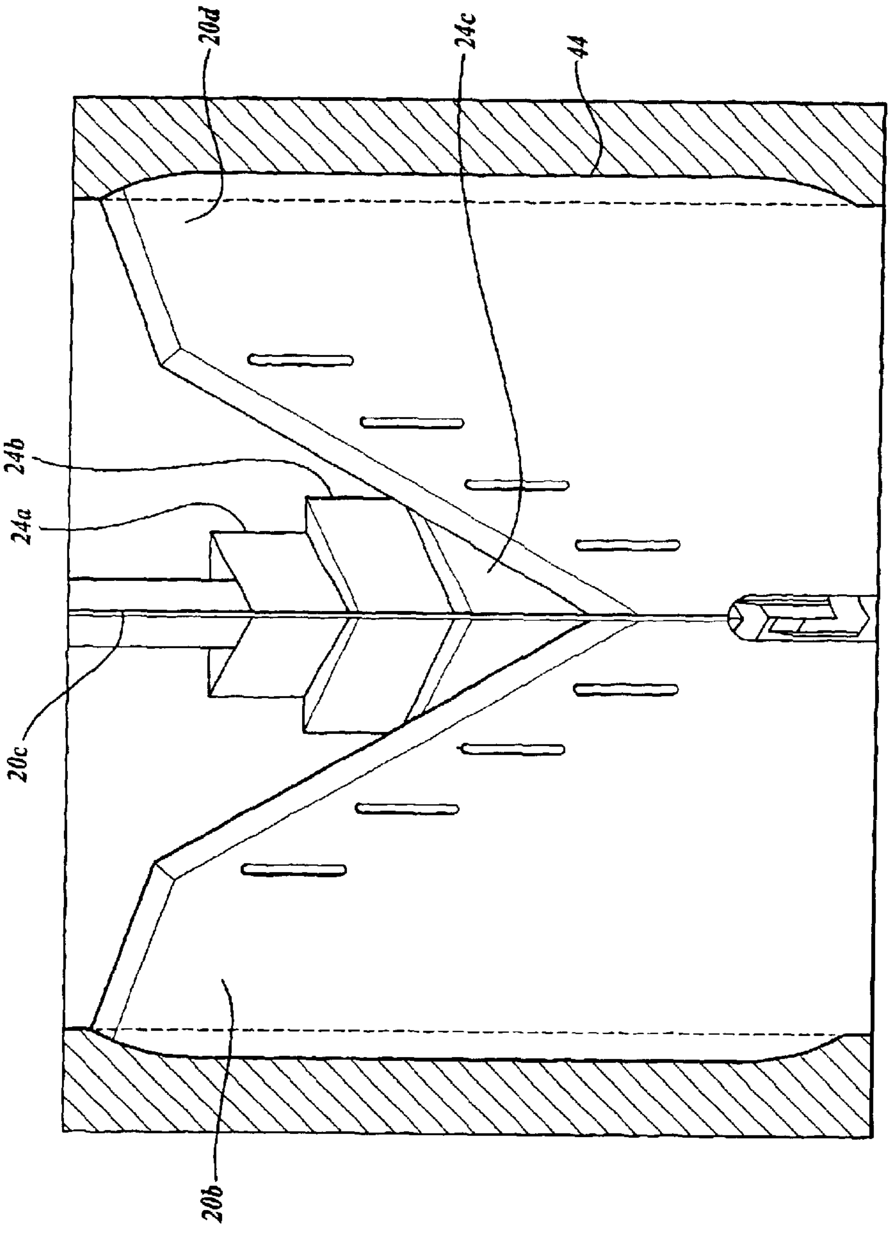
FIG. 7 is a cross-sectional view of the produce slicer depicted in FIG. 1, wherein the section cut is taken substantially through section 7—7 of FIG. 6.

Referring to FIGS. 3–6, the cutting blades 20 and 24 forming the concave cutting array 18 will now be described in further detail. FIG. 3 is an isometric view of the cutting array 18 showing the relationship of the radial cutting blades 20 to the ancillary cutting blades 24. FIG. 4 shows the radial cutting blades 20 of the cutting array 18 with the ancillary cutting blades removed. FIG. 5 shows the ancillary cutting blades 24 of the cutting array 18 with the radial cutting blades removed. FIG. 6 is a top view of the produce slicer 10 showing the relationship of the radial cutting blades 20 relative to the ancillary cutting blades 24.

Referring to FIGS. 3 and 4, the radial cutting blades 20 extend radially outward from the central axis 22, with the distal ends 46 of each of the radial cutting blades 20 terminating within the grooves 44 of the corner columns 30 (see FIG. 2), thereby securing the radial cutting blades 20 to the frame. The height of the radial cutting blades 20 increases as the distance of the radial cutting blade 20 from the central axis 22 increases. Thus, the cutting surfaces 25 are inclined relative to the central axis 22 such that the cutting array formed by the radial cutting blades 20 is concave in shape. In other words, the radial cutting blades 26 taper in height such that a height of each radial cutting blade is greater near the frame 12 than near the central axis 22. The radial cutting blades 20 have a plurality of apertures or slots 48 for permitting the ancillary cutting blades 24 to pass therethrough. The radial cutting blades 20 are suitably made from a rigid material, such as stainless steel or knife steel as is well known in the art.

Although the detailed description refers to the radial cutting blades 20*a*, 20*b*, 20*c*, and 20*d* as each being distinct entities (i.e., four separate cutting blades) for clarity, it should be apparent to those skilled in the art that the radial cutting blades 20 may be formed by joining opposing radial cutting blades into an integral unit. For instance, radial cutting blade 20*a* may be joined to radial cutting blade 20*c* and radial cutting blade 20*b* may be joined to radial cutting blade 20*d*, to form two elongate radial cutting blades extending from one corner to the opposite corner of the frame 12. Formed as such, the two elongate radial cutting blades may have notches (not shown) located along the central axis 22 to permit the passage of one of the radial cutting blades through the other, and to interlock the blades together. Alternately, the radial cutting blades 20 may be rigidly joined at the central axis 22 to form the radial cutting blades 20 into an integral unit. Further still, although the illustrated embodiment depicts four radial cutting blades 20 oriented at 90 degree angles from one another, it should be apparent to those skilled in the art that any number (either less than or greater than the four illustrated) of radial cutting blades 20 are suitable for use with the present invention, and therefore within the spirit and scope of the present invention.

Figure 8:
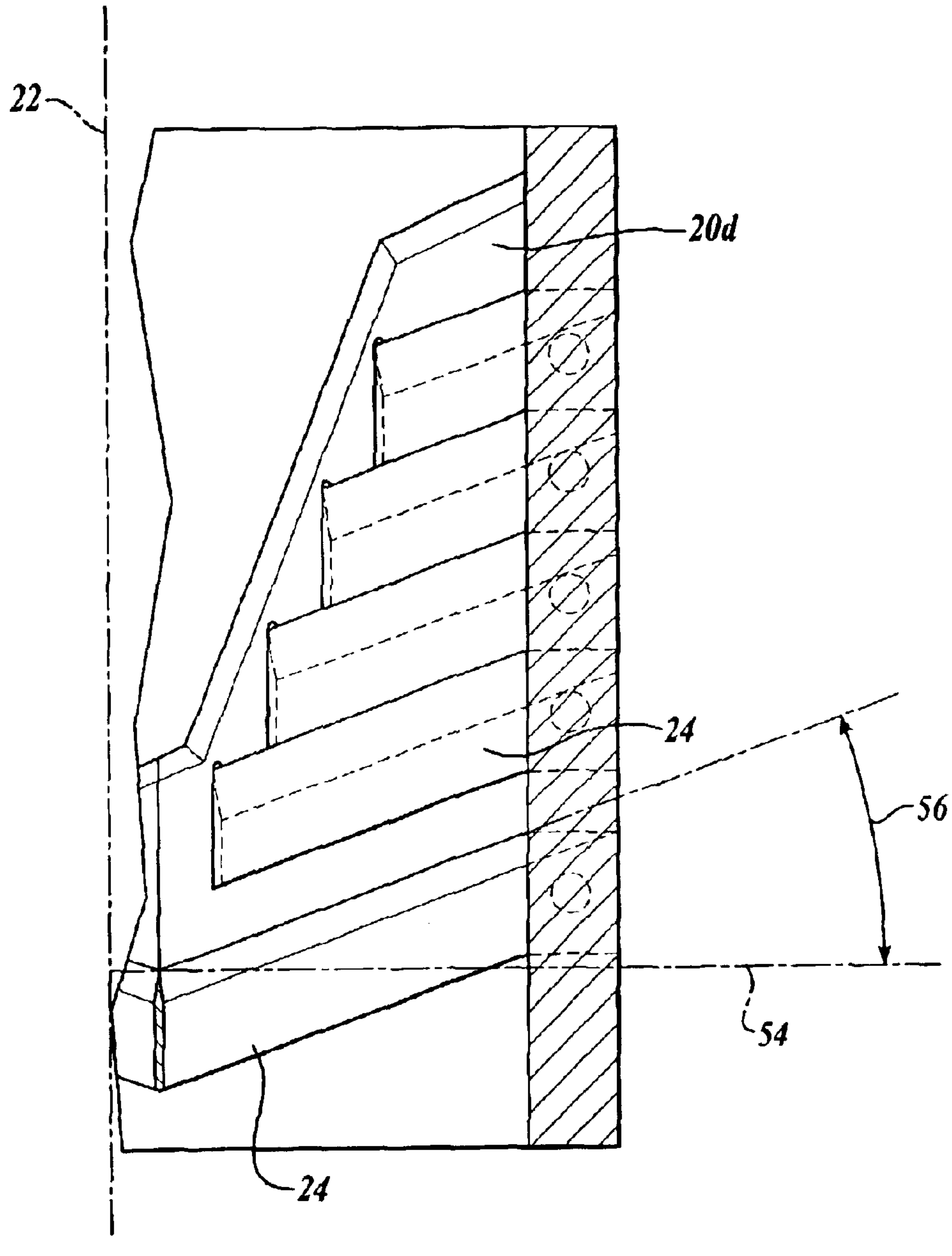
FIG. 8 is a cross-sectional view of the produce slicer depicted in FIG. 1, wherein the section cut is taken substantially through section 8—8 of FIG. 6.

Referring now to FIGS. 3 and 5 and focusing on the ancillary cutting blades 24, the ancillary cutting blades 24 extend inward from each wall of the frame 12 at a selected spacing interval from each other, such as a ½ of an inch as described above. The ancillary cutting blades 24 extend inward from their respective wall of the frame 12 until intersecting one of the four radial cutting blades 20. In the illustrated embodiment, each of the ancillary cutting blades 24 intersect the one of the radial cutting blades 20 between the frame 12 and the central axis 22, which the exception of the ancillary cutting blades 24*e*, which do intersect the radial cutting blades 20 at the central axis 22. Further, the ancillary cutting blades 24 extend inward from their respective wall at a slight incline such that the portion of the ancillary cutting blade 24 coupled to the wall 14 is at a higher elevation than the portion of the ancillary cutting blade 24 intersecting one of the radial cutting blades 20. Referring now to FIG. 8, in the illustrated embodiment, the ancillary cutting blades 24 are oriented at a selected angle 56 from a plane 54 oriented perpendicularly relative to the central axis 22. The selected angle ranges from about 5 degrees to about 80 degrees, with a preferred angle of about 20 degrees. Although a specific range of angles are described, it should be apparent to those skilled in the art that angles falling outside of this range are suitable for use with and within the spirit and scope of the present invention.

Referring to FIG. 6 each ancillary cutting blade 24 is contained by an imaginary plane (i.e. each ancillary cutting blade 24 is coplanar with an imaginary plane). In the illustrated embodiment, the imaginary planes are oriented parallel with the central axis 22 (See FIG. 1). However, it should be apparent to those skilled in the art that the imaginary planes may also be skewed or inclined relative to the central axis. The ancillary cutting blades 24 may be subdivided into a first series 50 of ancillary cutting blades 24, and a second series 52 of ancillary cutting blades 24. The first series 50 of ancillary cutting blades 24 are located between radial cutting blades 20*a* and 20*d* and between radial cutting blades 20*b* and 20*c*. The imaginary planes of the first series 50 of ancillary cutting blades 24 are preferably parallel to one another. In the illustrated embodiment, the first series 50 of ancillary cutting blades 24 intersect each of the imaginary planes containing the radial cutting blades 20 at an oblique angle, which is preferably about 45 degrees as shown in the illustrated embodiment.

The second series 52 of ancillary cutting blades 24 are located between radial cutting blades 20*a* and 20*b* and between radial cutting blades 20*c* and 20*d*. The imaginary planes of the second series 52 of ancillary cutting blades 24 are preferably parallel to one another. In the illustrated embodiment, the second series 52 of ancillary cutting blades 24 intersect each of the imaginary planes containing the radial cutting blades 20 at an oblique angle, which in the illustrated embodiment is about a 45 degree angle. Further, the imaginary planes of the first series 50 of ancillary cutting blades 24 intersect the imaginary planes of the second series 52 of ancillary cutting blades 24 at a substantially perpendicular angle, such as an angle between 45 and 135 degrees, with a preferred angle of 90 degrees.

Referring to FIG. 1, preferably, the ancillary cutting blades are removably coupled to the frame 12 by well known fasteners 38, allowing the ancillary cutting blades 24 to be removed for replacement, sharpening, cleaning, maintenance, etc. When coupled to the frame, the radial and ancillary cutting blades 20 and 24 are non-movably coupled to the frame. More specifically, once coupled to the frame 12, the cutting blades 20 and 24 do not slide, pivot, rotate, etc. relative to the frame 12.

Referring to FIG. 6, although the detailed description refers to the ancillary cutting blades 24*a*, 24*b*, 24*c*, 24*d*, and 24*e* as each being separate entities (i.e. formed from separate, non-integral cutting blades) for clarity, it should be apparent to those skilled in the art that the ancillary cutting blades 24 may be formed by joining the first series 50 of ancillary cutting blades 24 to the second series 52 at the point the ancillary cutting blades intersect the radial cutting blades 20, to form elongate ancillary cutting blades 24 generally L-shape in form. Formed as such, the elongate ancillary cutting blades 24 pass through the slots 48 (See FIG. 4) in the radial cutting blades 20, with the distal ends of the ancillary cutting blades 24 coupled to adjacent walls of the frame 12, as depicted in the illustrated embodiment. Alternately, the distal end of each ancillary cutting blade 24 may be affixed to the appropriate radial cutting blade 20 at the point of intersection (i.e. wherein the slots in radial cutting blades 20 are shown in the illustrated embodiment) by any suitable means, such as tack welding.

The ancillary cutting blades 24 of the illustrated embodiment are elongate members of a uniform height. The ancillary cutting blades 24 are suitably made from a rigid material, such as stainless steel or knife steel as is well known in the art. Although the ancillary cutting blades 24 are depicted as having a uniform height, it should be apparent to those skilled in the art that the height of the ancillary cutting blades 24 may vary.

Although in the illustrated embodiment, the cutting surfaces of both the ancillary and radial cutting blades are depicted as extending across the entire top edge of each of the cutting blades, it should be apparent to those skilled in the art that the cutting surfaces may not extend along the entire length of the cutting blade. More specifically, the cutting surface may only partially extend along the top edges of the cutting blades, for example, terminating prior to reaching the frame. Further still, although the illustrated embodiment depicts the radial cutting blades as extending from the central axis to the frame, it should be apparent to those skilled in the art that the radial cutting blades may only partially span this distance, for instance, terminating prior to the frame and/or terminating prior to the central axis.

While the preferred embodiment of the invention has been illustrated and described, it will be appreciated that various changes can be made therein without departing from the spirit and scope of the invention.

What is claimed is:

1. A produce slicer for slicing produce comprising:

(a) a frame defining a cavity having a central axis;

(b) a plurality of radial cutting blades disposed in the cavity, wherein each of the radial cutting blades are substantially contained by an imaginary plane, wherein the imaginary planes of the radial cutting blades extend radially outward from the central axis toward the frame; and (c) a plurality of ancillary cutting blades disposed in the cavity, each ancillary cutting blade intersecting at least one of the radial cutting blades at a location between the frame and the central axis, wherein the ancillary cutting blades include a first series and a second series of ancillary cutting blades each contained by an imaginary plane, where the imaginary planes of the first series are oriented substantially 45 to 135 degrees relative to the imaginary planes of the second series and wherein the imaginary planes of the radial cutting blades are located at an oblique angle relative the imaginary planes of the first and second series.

2. The produce slicer of claim 1, wherein each of the radial and ancillary cutting blades have a cutting surface, wherein the cutting surfaces form a concave cutting array.

3. The produce slicer of claim 1, wherein each of the ancillary cutting blades have a cutting surface, wherein the cutting surfaces are inclined relative to the central axis.

4. The produce slicer of claim 1, wherein each of the radial cutting blades have a cutting surface, wherein the cutting surfaces are inclined relative to the central axis.

5. The produce slicer of claim 1, wherein the imaginary planes of the first series are oriented substantially perpendicular to the imaginary planes of the second series.

6. The produce slicer of claim 1, wherein the imaginary planes of the radial cutting blades intersect the imaginary planes of the first and second series at about 45 degree angles.

7. The produce slicer of claim 1, wherein the radial cutting blades have a plurality of apertures, each aperture adapted to permit one of the ancillary cutting blades to pass therethrough.

8. The produce slicer of claim 1, wherein the ancillary cutting blades are removably coupled to the frame.

9. The produce slicer of claim 1, wherein the ancillary and radial cutting blades are non-movably coupled to the frame.

10. The produce slicer of claim 1, wherein each radial cutting blade tapers in height such that a height of each radial cutting blade is greater near the frame than near the central axis.

11. The produce slicer of claim 1, wherein the frame has a height oriented in the direction of the central axis, wherein the ancillary cutting blades are coupled to the frame at a plurality of heights.

12. The produce slicer of claim 11, wherein the ancillary cutting blades are coupled to the frame at three or more heights.

13. A produce slicer for slicing produce comprising:

(a) a frame disposed about a cavity having a central axis;

(b) a first series of cutting blades disposed in the cavity, each of the first series of cutting blades contained by an imaginary plane, the imaginary planes of the first series of cutting blades oriented substantially parallel to one another;

(c) a second series of cutting blades disposed in the cavity, each of the second series of cutting blades contained by an imaginary plane, the imaginary planes of the third series of cutting blades oriented substantially parallel to one another and oriented at an angle of about 45 to 135 degrees to the first series of imaginary planes; and (d) a third series of cutting blades disposed in the cavity, each of the third series of cutting blades contained by an imaginary plane, the imaginary planes of the second series of cutting blades extending radially outward from the central axis and located at oblique angles relative to the imaginary planes of the first and second series.

14. The produce slicer of claim 13, wherein the imaginary planes of the first series are oriented substantially perpendicular to the imaginary planes of the second series.

15. The produce slicer of claim 13, wherein the cutting blades of the first, second, and third series each comprise a cutting surface, wherein the cutting surfaces form a concave cutting array.

16. The produce slicer of claim 13, wherein the cutting blades of the first, second, and third series each comprise a cutting surface, wherein the cutting surfaces are inclined relative to the central axis.

17. The produce slicer of claim 13, wherein the frame has a height oriented in the direction of the central axis and wherein the cutting blades of the first and second series of cutting blades are coupled to the frame at a plurality of heights.

18. The produce slicer of claim 13, wherein the imaginary planes of the first and second series of cutting blades intersect the imaginary planes of the third series at approximately 45 degrees at a plurality of locations disposed between the frame and the central axis.

19. The produce slicer of claim 13, wherein the third series of cutting blades have a plurality of apertures, each aperture adapted to permit a cutting blade from the first or second series of cutting blades to pass therethrough.

20. The produce slicer of claim 13, wherein the cutting blades of the first and second series are removably coupled to the frame.

21. The produce slicer of claim 13, wherein the cutting blades of the first, second, and third series are non-movably coupled to the frame.

22. The produce slicer of claim 13, wherein the cutting blades of the third series are tapered in height such that a height of each cutting blade of the third series is greater near the frame than near the central axis.

23. A produce slicer for slicing produce comprising:

(a) a frame defining a cavity having a central axis;

(b) a plurality of radial cutting blades disposed in the cavity, each radial cutting blade oriented parallel with an imaginary plane, each imaginary plane extending radially outward from the central axis towards the frame, wherein each of the radial cutting blades have a cutting surface, the cutting surface inclined relative to the central axis;

(c) a plurality of ancillary cutting blades disposed in the cavity, the ancillary cutting blades extending inward from the frame and intersecting at least one of the radial cutting blades between the frame and the central axis, wherein each of the ancillary cutting blades have a cutting surface, the cutting surface inclined relative to the central axis, wherein the ancillary cutting blades include a first series and a second series of ancillary cutting blades each contained by an imaginary plane, wherein the imaginary planes of the first series are oriented substantially between about 45 and 135 degrees to the imaginary planes of the second series, and wherein the imaginary planes of the radial cutting blades are oriented at oblique angles to the imaginary planes of the first and second series; and (d) wherein the cutting surfaces of the radial and ancillary cutting blades form a concave cutting array.

24. The produce slicer of claim 23, wherein the imaginary planes of the first series are oriented substantially perpendicular to the imaginary planes of the second series.

25. The produce slicer of claim 24, wherein the imaginary planes of the radial cutting blades intersect the imaginary planes of the first and second series at substantially 45 degree angles.

* * * * *

UNITED STATES PATENT AND TRADEMARK OFFICE

CERTIFICATE OF CORRECTION

| | |
|---|---|
| PATENT NO. | : 6,959,636 B2 |
| APPLICATION NO. | : 10/406909 |
| DATED | : November 1, 2005 |
| INVENTOR(S) | : J.M. Graziano |

It is certified that error appears in the above-identified patent and that said Letters Patent is hereby corrected as shown below:

| COLUMN | LINE | ERROR |
|---|---|---|
| 8 (Claim 13, | 54 line 10) | "third" should read --second-- |
| 8 (Claim 13, | 60 line 16) | "second" should read --third-- |

Signed and Sealed this

Third Day of June, 2008

JON W. DUDAS

*Director of the United States Patent and Trademark Office*